United States Patent
Dettmar et al.

[11] Patent Number: 5,928,376
[45] Date of Patent: Jul. 27, 1999

[54] PROCESS FOR RECEIVING A SIGNAL CODED AND MODULATED ACCORDING TO AN ETS-HIPERLAN STANDARD

[75] Inventors: Uwe Dettmar, Tägerig; Armin Wittneben, Rütihof; Weilin Liu, Fislisbach, all of Switzerland

[73] Assignee: Ascom Tech AG, Bern, Switzerland

[21] Appl. No.: 08/797,624

[22] Filed: Feb. 7, 1997

[30] Foreign Application Priority Data

Mar. 13, 1996 [CH] Switzerland ............................. 668/96

[51] Int. Cl.$^6$ .................................................. H03M 13/00
[52] U.S. Cl. .......................... 714/782; 714/780; 375/244; 375/324; 375/325
[58] Field of Search .............................. 371/37.01–37.12, 371/38.1, 39.1, 40.11–40.18, 41, 42, 43.1–43.8, 44, 45, 46; 375/324, 325, 244, 264

[56] References Cited

U.S. PATENT DOCUMENTS

| 4,553,237 | 11/1985 | Nakamura | 371/37.04 |
| 5,168,509 | 12/1992 | Nakamura et al. | 375/286 |
| 5,222,077 | 6/1993 | Kirshnan | 375/261 |
| 5,412,687 | 5/1995 | Sutton et al. | 375/202 |
| 5,706,313 | 1/1998 | Blasiak et al. | 375/330 |

Primary Examiner—Emmanuel L. Moise

[57] ABSTRACT

A method and apparatus for receiving a signal by the ETS/HIPERLAN standard. In the method decoding is done by the BCH standard. Differential pre-coding is done and integration for cancelling transmitter side differential pre-coding is done only after BCH encoding. The apparatus contains a non-coherent demodulation a BCH decoder and an integrator.

9 Claims, 3 Drawing Sheets

FIG. I (PRIOR ART)

PROCESS FOR RECEIVING A SIGNAL CODED AND MODULATED ACCORDING TO AN ETS-HIPERLAN STANDARD

BACKGROUND OF THE INVENTION

1. Field of the Invention

The present invention relates to a method and apparatus for simplifying a signal coded and modulated by the ETS (European Telecommunication Standard)—HIPERLAN (High Performance Radio Local Area Network).

2. Description of the Prior Art

The so-called European Telecommunications Standard (ETS) defines the technical characteristics of a wireless local high performance network (High Performance Radio Local Area Network=HIPERLAN). HIPERLAN is a short-range communications subsystem with a high data rate (compare ETSI 1995, ETS 300 652, UDC: 621 396).

The ETS-HIPERLAN standard is intended for USC in the 5.15 to 5.30 GHz frequency band.

The HIPERLAN standard exactly defines the mapping of data onto the transmitted signal which is effected by coding and modulation. A receiver for a signal structured in this way can accomplish inverse mapping by sequentially cancelling the operations undertaken in the transmitter for generating the transmitted signal. For a receiver which is based on coherent demodulation this is not a problem for the most part in a transmitted signal formed according to the HIPERLAN standard.

Noncoherent demodulators are somewhat less complex than coherent demodulators and would be advantageous for HIPERLAN. But it happens that the step-by-step cancellation of the encoder and modulation stages in noncoherent reception leads to behaviours causing fatal error.

DESCRIPTION OF THE INVENTION

The object of the invention is to devise a process for receiving a signal which is coded and modulated according to an ETS-HIPERLAN standard, which makes do with a receiver structure as simple as possible, and which achieves a packet error rate as close as possible to that of a coherent receiver.

The solution according to the invention is defined by the method and apparatus disclosed. The invention is based on the finding that encoder and modulation steps during reception should not be inverted in corresponding steps of the method. Differential precoding should only be cancelled after de-interleaving and BCH (Bose Chaudhuri-Hocquenghem) decoding. In signal transmission the sequence of steps relevant to the invention is not "BCH coding—differential precoding—inversion of differential preceding—inversion of BCH coding", but "BCH encoding—differential preceding—inversion of BCH coding—inversion of differential preceding". Of course, other different processing steps can be inserted in front of, between, and after the indicated steps described relevant to the invention.

The sequence of steps according to the invention entails the fact that the first code word of a data packet on the receiver side is no longer necessarily a BCH code word. There are now different possibilities for taking this circumstance into account. According to a first preferred embodiment the first code word is excluded by error correction. (Since the BCH code used is systematic, the first 26 bits which contain information are output and the remaining 5 bits are simply deleted. This is thus possible for any systematic code). The first code word is therefore passed essentially unprocessed by the BCH decoder.

Another version consists in that the first code word is processed with a soft decision decoding process which ignores only the first bit of the code word. With soft decision coding therefore also the first word can be protected to a certain degree against errors. However error protection is less than in the other 15 BCH code words, since the minimum Hamming distance is only 2 instead of 3. The computer cost is somewhat greater in this decoding. One example of a soft decision coding process is so-called erasure decoding. In erasure decoding the bit which was subject to the greatest error probability or decision-making uncertainty in detection is erased and replaced by the expected one.

In integration (for canceling the differential preceding) the last bit of the immediately preceding synchronization sequence is used for initialization.

A circuit for executing the process thus has a non-coherent demodulator, a circuit which is directly connected in terms of the signal stream for de-interleaving and BCH decoding, and only adjacent thereto an integrator. The digital part of the noncoherent demodulator, de-interleaving, BCH decoding and integration can be combined in a single signal processor. Hardware and software implementation of the process according to the invention does not pose any special difficulties to one skilled in the art.

Other details and combinations of features follow from the following detailed description.

BRIEF DESCRIPTION OF THE DRAWINGS

The drawings used to explain the embodiment show the following.

Essentially the same parts are labelled with the same reference numbers in the different Figures.

EMBODIMENTS OF THE INVENTION

Figure 1:
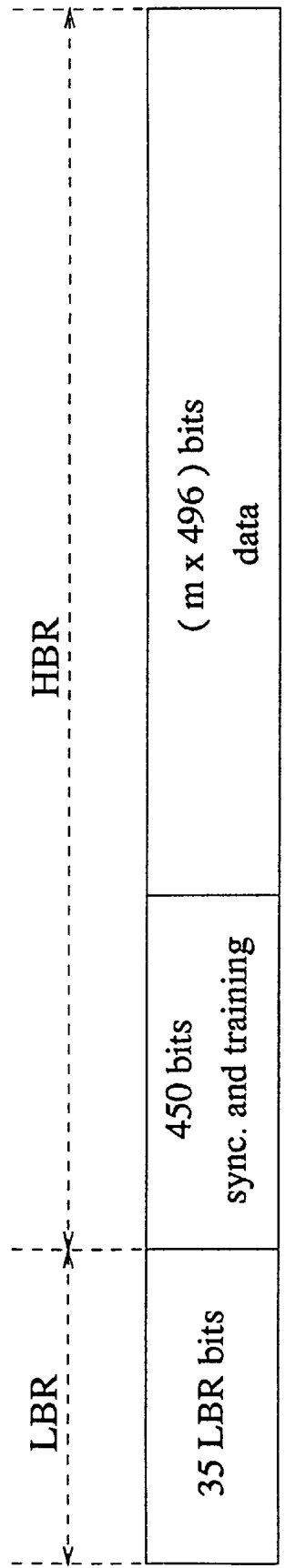
FIG. 1 illustrates the structure of a data packet according to the HIPERLAN standard.

HIPERLAN uses burst transmission. The data to be transmitted are therefore combined into data packets. FIG. 1 shows the contents of one such data packet. It is formed by one LBR and one HBR part (LBR=low bit rate, HBR=high bit rate). The LBR part contains 35 bits with a length of 680 ns each. The HBR part itself consists of a preamble of 450 bits (for receiver synchronization and training and a selectable number m ($0<m \leq 47$) of data blocks with 496 bits each. The bit duration in the HBR part is 42.4 nm (i.e. $1/16$ of the bit duration in the LBR part).

The modulation format for the data in the LBR part is FSK (frequency shift keying). The LBR part contains the destination address of the packet. Based on this destination address the receiver can decide whether it must process the following HBR part or not. The LBR part is not detailed below, since it is not imperatively associated with the invention.

Figure 2:
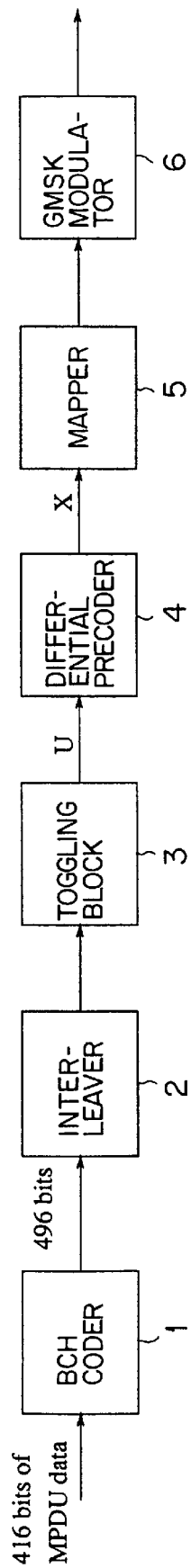
FIG. 2 illustrates a block diagram with the important coding and modulation steps according to the HIPERLAN standard.
Figure 3:
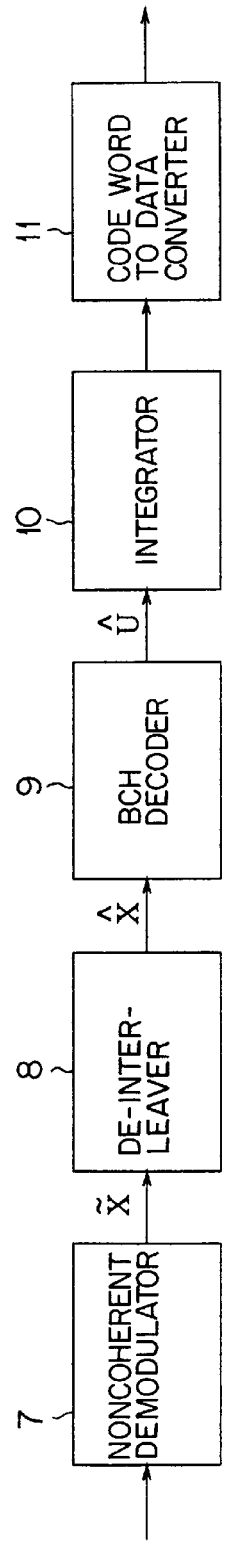
FIG. 3 illustrates a block diagram of a receiver according to the invention.

FIG. 2 shows a block diagram of a coding and modulation process which corresponds to the ETS-HIPERLAN standard. Those parts which relate to the processing of the LBR part have been omitted. Furthermore, it should be noted that the block diagram represents only the so-called physical layer. Above it is the MAC layer. The latter accepts the MPDU data (MPDU=MAC-Protocol Data Unit) in blocks of 416 bits. Each such block is divided into 16 subblocks with 26 bits each. The subblocks are subjected to a systematic (31, 26, 3) BCH code (BCH coder 1). This code has a Hamming distance of 3. The resulting 16 BCH code words (with a length of 31 bits each) are processed in interleaver 2. In doing so the code words are written into the columns of a matrix and are read out line by line.

In following toggling block 3 the bits are inverted in pairs (i.e., the bits with indices 2, 3, 6, 7, 10, 11 etc., the others are retained unchanged). Toggling has no effect on the error behavior of the data transmission process and is therefore not mentioned below.

Differential precoder 4 executes mod-2 addition of two successive bits:

$$x(i) = \text{Not } (u(i) \oplus u(i-1))$$

This is followed by mapper 5 which transforms the unipolar data into bipolar data for GMSK modulation (0→1, 1→−1). The described operations can be shown more simply as follows $$x(i) = (u(i) \oplus u(i-1))$$
$$0 \to -1$$
$$1 \to 1$$

Finally, the symbols from mapper 5 are transferred to GMSK modulator 6 for transmission at a frequency of for example 5.3 GHz.

GMSK is a frequency or phase increment modulation pattern in which phase integration is inherently contained. The HIPERLAN standard establishes that bursts which are not completely error-free after demodulation and BCH decoding must be re-sent. Whether a received burst is regarded as error-free or not after demodulation and BCH decoding is decided by the subsequent decoding of a CRC code.

Figure 4:
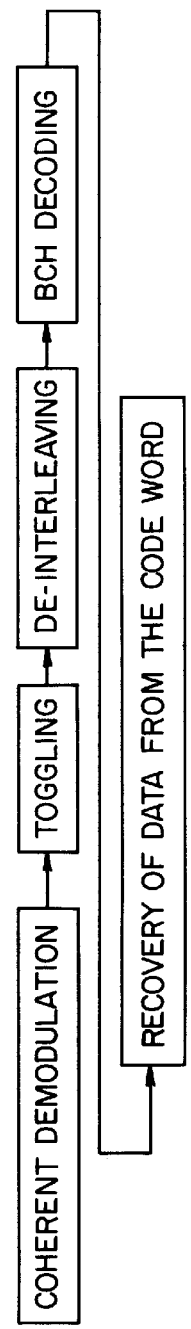
FIG. 4 illustrates a brown coherent receiver in flow chart form.

The differential precoding compensates this phase regulation and converts the frequency (or phase increment) modulation pattern into a phase modulation pattern. For this reason the received signal is predestined for demodulation with a coherent receiver. Decoding of the data takes place then in principle by arranging the inverting blocks in succession in reverse order (coherent demodulation, toggling, de-interleaving, BCH decoding, recovery of data from the code word). This is illustrated in FIG. 4.

The receiver-side processing described for coherent reception is however not feasible for noncoherent preceding. The integrator for cancelling the differential preceding leads to unlimited error propagation. A single error in the noncoherent demodulator would lead to all successive bits being wrong. Subsequent BCH decoding then becomes useless. System performance and especially the packet error rate become unacceptable.

As is apparent from FIG. 2, according to the invention in a receiver with noncoherent demodulator 7, de-interleaver 8 and BCH decoder 9 are placed in front of integrator 10. Element 11 is a code word to data converter. Element 11 is known in the art.

If $U(n)$ $$U(n) = \begin{pmatrix} u_{1,1}(n) & u_{1,2}(n) & \ldots & u_{1,16}(n) \\ u_{2,1}(n) & u_{2,2}(n) & \ldots & u_{2,16}(n) \\ \ldots & \ldots & \ldots & \ldots \\ u_{31,1}(n) & u_{31,2}(n) & \ldots & u_{31,16}(n) \end{pmatrix}$$

designates block n (0<n≦m) of a packet after coding and interleaving, this column of U(n) is then a code word. Due to interleaving, block U(n), as already mentioned, is read out line by line for subsequent precoding.

If $X(n)$ $$X(n) = \begin{pmatrix} x_{1,1}(n) & x_{1,2}(n) & \ldots & x_{1,16}(n) \\ x_{2,1}(n) & x_{2,2}(n) & \ldots & x_{2,16}(n) \\ \ldots & \ldots & \ldots & \ldots \\ x_{31,1}(n) & x_{31,2}(n) & \ldots & x_{31,16}(n) \end{pmatrix}$$

designates block n after differential precoding, it can be shown that with one exception each column X(n) is a BCH code word. The aforementioned sole exception relates to first column $x_1(n)$. The latter is not necessarily a BCH code word. First bit $x_{1,1}(n)$ depends specifically on the last bit of the previous block:

$$x_{1,1}(n) = x_{31,16}(n-1) \oplus u_{1,1}(n)$$

The BCH coding used has a Hamming distance of 3. It was now possible to prove that the remaining 30 bits ($x_{2,1}(n)$ ... $x_{31,1}(n)$) form a code with a minimum Hamming distance of 2. In this way it becomes possible to apply a soft-decision decoding process to the indicated 30 bits.

It should be watched that 15 of the total 16 columns of X(n) have still remained BCH code words. Therefore BCH coding can be applied to these columns in the conventional manner. This means that in 15 of the 16 columns one individual error at a time can be corrected.

The first column can either be transferred directly to the output or processed with a soft decision decoding process. The soft decision decoding process ignores only the first bit of the first column. All other bits are checked. The reliability information required for the soft-decision decoding originates from the noncoherent demodulator.

One simple method of executing soft-decision decoding consists in ignoring the bit encumbered with the greatest decision-making uncertainty. Afterwards so-called erasure decoding can be used, i.e., the most uncertain bit is reconstructed on the basis of existing coding. Based on the arrangement of the integrator according to the invention the packet error rate (relevant to HIPERLAN) does not suffer from the error propagation effect.

The utility of soft-decision decoding depends largely on the feasible computer cost (due to the decoder complexity) and the reliability of the soft-decision decoding information.

Figure 5:
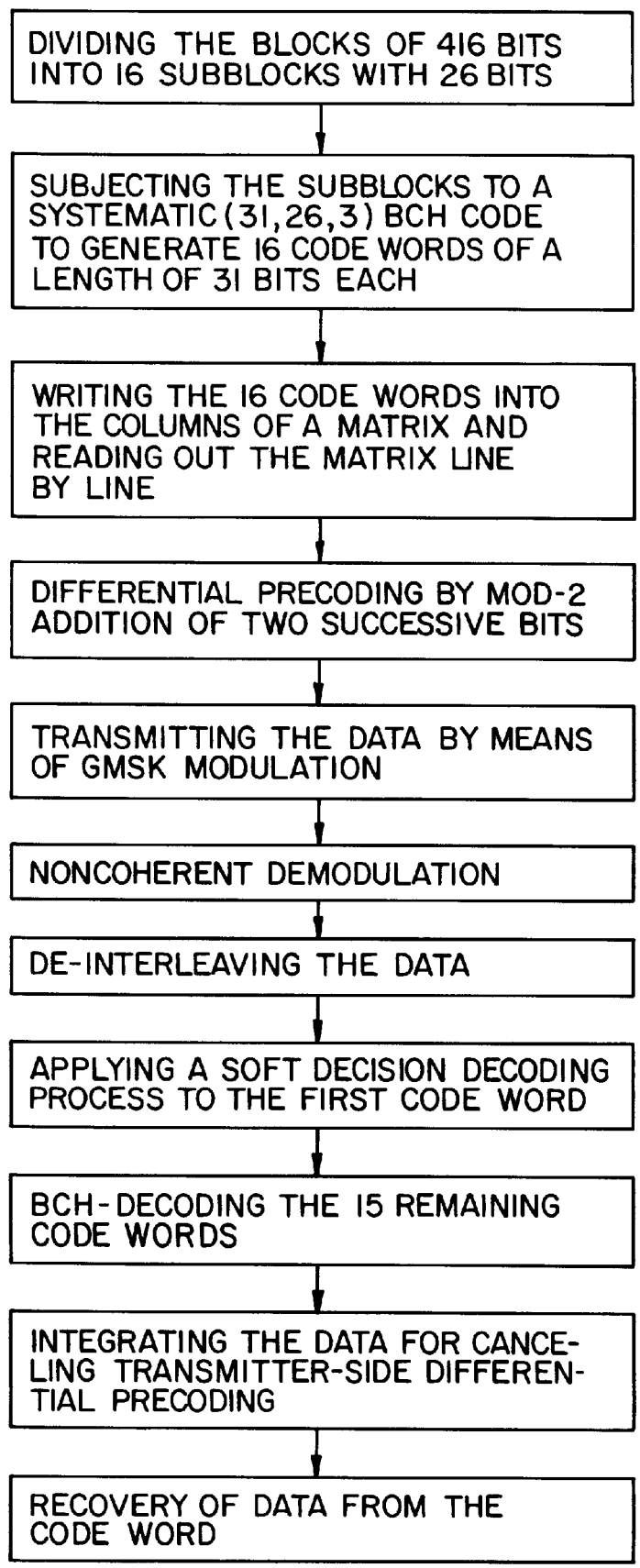
FIG. 5 illustrates a preferred method in flow chart form.

FIG. 5 illustrates a method of a preferred embodiment. The flow chart of FIG. 5 sets forth steps of the method disclosed.

In summary, it can be stated that the invention makes it possible to simplify a HIPERLAN receiver in the demodulation stage. The invention can be used wherever on the transmitter side there are structures comparable to the HIP- ERLAN standard and on the receiver side a noncoherent demodulator is desired.

We claim:

1. A process for transmitting and receiving a signal comprising the steps of:
   (a) first, BCH encoding the signal in accordance with ETS-HIPERLAN standard,
   (b) second, differential pre-coding of the encoded signal in accordance with ETS-HIPERLAN standard,
   (c) modulating the pre-coded signal with a GMSK modulator,
   (d) demodulating the modulated signal with a non-coherent demodulator,
   (e) BCH decoding the demodulated signal, and
   (f) integrating the decoded signal for cancelling transmitter-side differential pre-coding
   wherein said integrating step for cancelling transmitter-side differential pre-coding is executed only after BCH decoding.

2. A process according to claim 1, wherein in BCH decoding the first code word of a data packet is excluded by error correction.

3. A process according to claim 2, wherein the first code word is decoded with a soft-decision decoding process which ignores only the first bit of the code word.

4. A process according to claim 3, wherein the soft-decision decoding process operates according to an erasure decoding principle.

5. A process according to claim 4, wherein the last bit of a preceding synchronization sequence is used for initialization in integrating.

6. A process according to claim 3, wherein the last bit of a preceding synchronization sequence is used for initialization in integrating.

7. A process according to claim 2, wherein the last bit of a preceding synchronization sequence is used for initialization in integrating.

8. A process according to claim 1, wherein the last bit of a preceding synchronization sequence is used for initialization in integrating.

9. A circuit comprising:
   means for receiving a GMSK modulated signal,
   a non-coherent demodulator that demodulates the received GMSK modulated signal,
   a BCH decoder that decodes a signal derived from the demodulated signal, and
   an integrator,
   wherein the integrator follows BCH decoder as defined by signal flow for cancelling of differential precoding.

* * * * *